(12) United States Patent
Mehta et al.

(10) Patent No.: US 6,499,074 B1
(45) Date of Patent: Dec. 24, 2002

(54) REDIRECTING I/O ADDRESS HOLES

(75) Inventors: Pratik M. Mehta, Austin, TX (US); Michael S. Quimby, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/379,019

(22) Filed: Aug. 23, 1999

(51) Int. Cl.⁷ .............................................. G06F 13/00
(52) U.S. Cl. ........................... 710/104; 710/8; 713/100
(58) Field of Search ................. 710/305, 104, 710/8–19; 713/1, 2, 100

(56) References Cited

U.S. PATENT DOCUMENTS

| | | | |
|---|---|---|---|
| 5,309,568 A | * 5/1994 | Ghosh et al. | 710/129 |
| 5,590,289 A | * 12/1996 | Nardone et al. | 710/109 |
| 5,668,949 A | * 9/1997 | Nardone et al. | 709/201 |
| 5,826,105 A | * 10/1998 | Burstein et al. | 710/22 |
| 5,835,738 A | * 11/1998 | Blackledge, Jr. et al. | 710/127 |
| 6,098,113 A | * 8/2000 | Heil et al. | 710/1 |
| 6,173,383 B1 | * 1/2001 | Casametta | 711/202 |
| 6,247,079 B1 | * 6/2001 | Papa et al. | 710/103 |
| 6,253,334 B1 | * 6/2001 | Amdahl et al. | 714/4 |
| 6,336,158 B1 | * 1/2002 | Martwick | 710/104 |

OTHER PUBLICATIONS

The Indispensable PC Hardware Book: Your Hardware Questions Answered, Third Edition, by Hans–Peter Messmer, copyright © Addison Wesley Longman 1997, title page and pp. 539, 540, 614–630.

* cited by examiner

*Primary Examiner*—Sumati Lefkowitz
(74) *Attorney, Agent, or Firm*—Akin Gump Strauss Hauer & Feld LLP

(57) ABSTRACT

A processor-oriented system, such as a microcontroller or computer system, supports a programmable address decoder used to redirect accesses to unassigned I/O address space. I/O accesses to unassigned addresses or address holes can be directed to multiple busses. If a programmable switch associated with the programmable address decoder is set to a first predetermined value, then certain I/O addresses are directed to a first bus. If the programmable switch associated with the programmable address decoder is set to a second predetermined value, then certain I/O addresses are directed to a second bus. If the first bus is coupled to PC/AT compatible peripheral devices and the second bus is coupled to non-PC/AT compatible devices, then the I/O address redirection capability selectively supports a PC/AT compatible mode or a non-PC/AT compatible mode. Certain integrated devices coupled to the second bus can be bypassed or disabled as desired to allow redirection of I/O to external devices coupled to the first bus.

16 Claims, 4 Drawing Sheets

| INTEGRATED DEVICE | I/O ADDRESS RANGE |
|---|---|
| SLAVE GP-BUS DMA CONTROLLER | 0000h–000Fh |
| MASTER PROGRAMMABLE INTERRUPT CONTROLLER (PIC) | 0020h–0021h |
| SLAVE PROGRAMMABLE INTERRUPT CONTROLLER (PIC) | 0024h–0025h |
| PROGRAMMABLE INTERVAL TIMER (PIT) | 0040h–0043h |
| KEYBOARD CONTROL A20M AND FAST RESET (SCP) | 0060h, 0064h |
| SYSTEM CONTROL PORT B/NMI STATUS | 0061h |
| REAL TIME CLOCK (RTC) INDEX/DATA | 0070h, 0071h |
| GENERAL PURPOSE SCRATCH REGISTERS | 0080h<br>0084h–0086h<br>0088h<br>008Ch–008Eh |
| GENERAL PURPOSE SCRATCH REGISTER | 008Fh |
| GP-BUS DMA PAGE REGISTER | 0081h–0083h<br>0087h<br>0089h–008Bh |
| SYSTEM CONTROL PORT A | 0092h |
| SLAVE PROGRAMMABLE INTERRUPT CONTROLLER (PIC) | 00A0h–00A1h |
| MASTER GP-BUS DMA CONTROLLER | 00C0h–00Deh<br>(EVEN ADDRESSES ONLY) |
| CLEAR FLOATING POINT ERROR INTERRUPT REQUEST | 00F0h |
| SERIAL PORT COM2 (UART #2) | 02F8h–02FFh |
| SERIAL PORT COM1 (UART #1) | 03F8h–03FFh |

*FIG. 2*

REDIRECTING I/O ADDRESS HOLES

BACKGROUND OF THE INVENTION

1. Field of the Invention

The present invention generally relates to processor-oriented systems with a direct mapped I/O architecture.

2. Description of the Related Art

Conventional computer systems provide an I/O address space, which can be accessed with machine instructions such as IN and OUT via addresses in the I/O address space, usually referred to as "ports." The standard PC architecture supports an I/O address space of 64K ports using the addresses 0000h to FFFFh. The ports in I/O address space are mostly used for addressing registers in peripheral devices. The IN and OUT instructions transfer data between a processor and the peripheral device registers. When a conventional computer system performs an I/O mapped input or output, the registers have been located in the I/O address space, in contrast to memory mapped I/O, where the peripheral device registers are located in the conventional memory address space. When an I/O mapped input or output is to be performed, a processor usually sends an address signal to an address decoder which decodes the address and then addresses the proper port.

The IBM PC/AT architecture defined a set of ports which has become an industry standard. These ports provide standard I/O addresses for such devices as Direct Memory Access (DMA) controllers, keyboards, interrupt controllers, programmable interval timers and serial I/O. In modem microprocessors, many of these devices are often integrated into the processor chipset. However, not all addresses in the 64K I/O address space are assigned by the PC/AT standard. I/O to unassigned ports is typically sent to a bus controller where either some device will respond to the I/O attempt or an error will be generated.

Even for computer systems providing a peripheral bus such as a Peripheral Component Interconnect (PCI) bus, ports have not typically been directly mapped to the peripheral bus. New devices built for such a peripheral bus therefore have been indirectly mapped, at a cost of performance. While I/O to a direct mapped device is sent directly one or more of the ports assigned to the direct mapped device with an I/O instruction, I/O to an indirectly mapped device has typically been performed by sending both the address and the data to one or more ports assigned to the device or to a bus controller. For example, PCI bus devices are typically indirectly mapped using a pair of I/O ports at 0CF8h and 0CFCh. To write a PCI device register, systems load an address in one port, and then data to the other port.

Many conventional computer systems have provided integrated I/O devices to which standard ports are permanently assigned. In conventional computer systems, I/O to unassigned ports has been sent to a peripheral bus, typically an Industry Standard Architecture (ISA) bus, for decoding.

SUMMARY OF THE INVENTION

Briefly, a processor-oriented system provides a flexible way to send accesses to ports not assigned to integrated I/O devices to one of two busses, as controlled by a programmable address decoder. The programmable address decoder includes a programmable address router to route I/O addresses to the two busses under the control of a programmable switch. When the programmable switch provides a first predetermined value, the programmable address router routes I/O addresses to the first bus. When the programmable switch provides a second predetermined value, the programmable address router routes I/O addresses to the second bus. One advantage of such a mechanism is that new devices built for a second bus can be directly mapped to the relevant ports, avoiding performance penalties.

Another aspect of such a system allows disabling integrated I/O devices coupled to the first bus and allowing I/O for the associated ports to be passed to other devices on the bus by the bus controller. In one aspect, the first bus may have an internal and an external portion. One advantage of this aspect is that this allows connection of external devices such as a standard Super I/O chip, in place of integrated I/O devices.

BRIEF DESCRIPTION OF THE DRAWINGS

A better understanding of the present invention can be obtained when the following detailed description of the preferred embodiment is considered in conjunction with the following drawings, in which:

FIG. 2 is a table of integrated devices of the microcontroller of FIG. 1 and associated I/O address ranges;

DETAILED DESCRIPTION OF THE PREFERRED EMBODIMENT

The following related patent applications are hereby incorporated by reference as if set forth in their entirety:

U.S. patent application Ser. No. 09/379,015, bearing Attorney Docket No. A99118US, entitled METHOD AND APPARATUS FOR OVERLAPPING PROGRAMMABLE ADDRESS REGIONS, filed concurrently;

U.S. patent application Ser. No. 09/379,012, bearing Attorney Docket No. A99117US, entitled GENERAL PURPOSE BUS WITH PROGRAMMABLE TIMING, filed concurrently;

U.S. patent application Ser. No. 09/379,457, bearing Attorney Docket No. A99113US, entitled FLEXIBLE MICROCONTROLLER ARCHITECTURE, filed concurrently; and U.S. patent application Ser. No. 09/379,456, bearing Attorney Docket No. A99112US, entitled FLEXIBLE PC/AT-COMPATIBLE MICROCONTROLLER, filed concurrently.

Microcontroller

Figure 1:
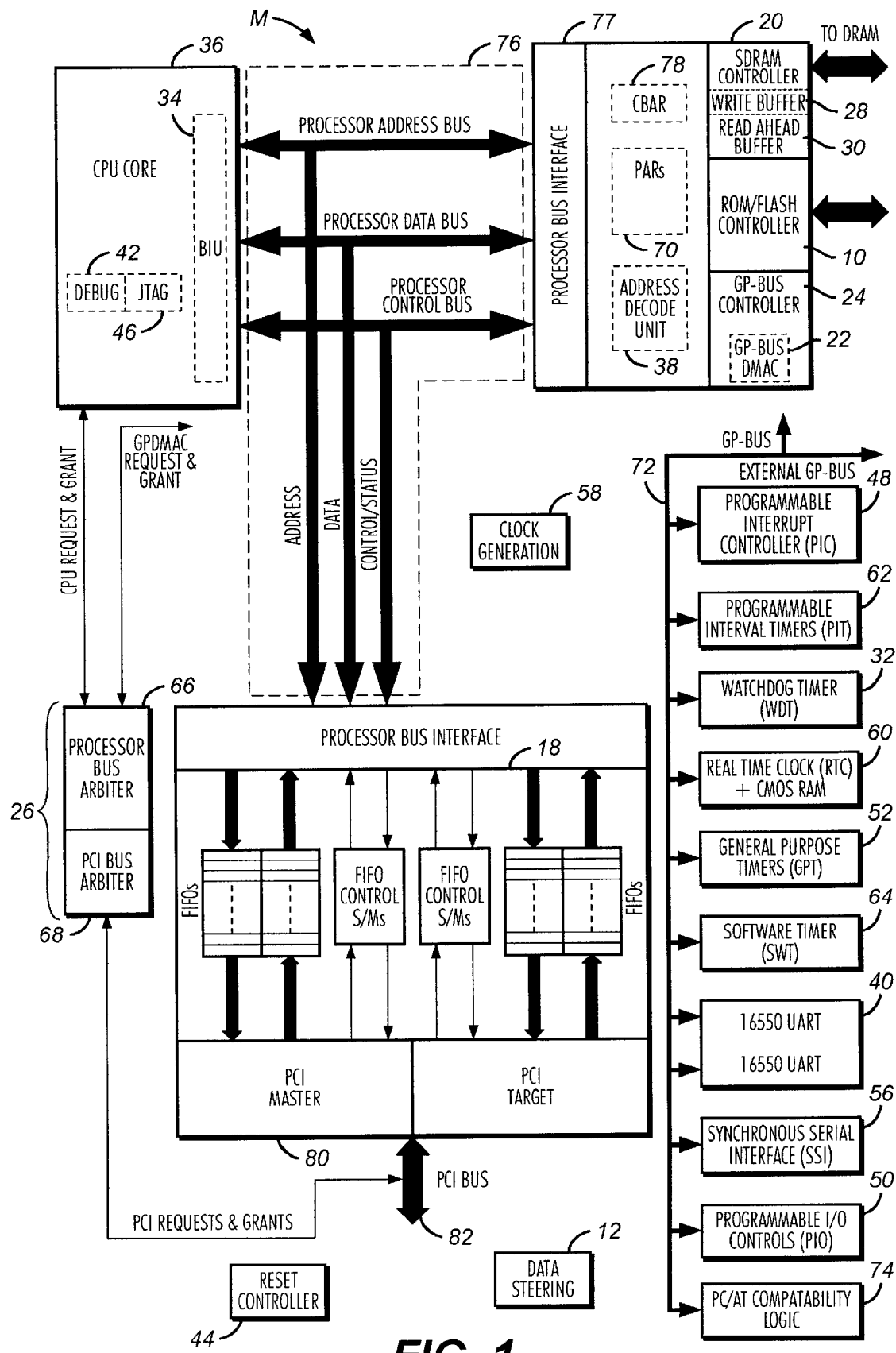
FIG. 1 is a block diagram of an exemplary microcontroller.

Turning now to the drawings, FIG. 1 shows a typical microcontroller M in accordance with the present invention. The microcontroller M provides a highly integrated CPU 36 with a complete set of peripherals that are a superset of common PC/AT peripherals and with a set of memory mapped peripherals. In the disclosed exemplary embodiment, the CPU 36 is the Am5x86 CPU core, which utilizes the industry standard x86 microprocessor instruction set. The CPU 36 includes an integrated 16K write back cache.

The microcontroller M provides Programmable Address Region (PAR) registers 70 that enable flexible placement of memory and peripherals into a memory address space and an I/O address space. The PAR registers 70 also allow control of important attributes like cacheability, write protection, and code execution control for memory resources. Both the PAR registers 70 and a Configuration Base Address register (CBAR) 78 serve as address decode registers. While the PAR registers 70 are memory-mapped, the CBAR 78 is direct-mapped to I/O.

An address decoding unit (ADU) 38 provides flexible distributed memory and I/O address decode logic. Address decode is distributed between a general purpose (GP) bus Controller 24, memory controllers such as a read-only memory (ROM) controller 10 and a dynamic random access memory (DRAM) controller 20, and a Peripheral Component Interconnect (PCI) bus 82. PC/AT-compatible peripherals are direct-mapped to I/O, and remaining integrated peripherals are memory-mapped. The memory space and I/O space of a general purpose bus 72 are accessible by the CPU 36, the PCI master controller 80, and external PCI bus masters. The memory space and I/O space of the PCI bus 82 are accessible by the CPU 36 and PCI masters 80.

A system arbiter 26 includes an arbiter 66 for performing arbitration for a processor bus 76 (shown divided into its address, data, and control portions) and an arbiter 68 for performing arbitration for the PCI bus 82. The processor bus arbiter 66 may arbitrate between several possible processor bus masters. For example, the processor bus arbiter 66 may handle requests for the CPU 36, the general purpose bus DMA controller 22, and the PCI host bridge 18 on behalf of an external bus master requesting access to DRAM. The PCI bus arbiter 68 may arbitrate between five possible PCI masters.

A processor bus interface 77 integrated with the CPU 36 is responsible for DMA cache snooping, dynamic clock speed adjusting, dynamic bus sizing, ready signal consolidation, Memory Mapped Configuration Region (MMCR) control, and general purpose address control. A bus interface unit (BIU) 34 basically assists the CPU 36 with bus, DMA, and memory control.

A clocks module 58 provides oscillators and phase locked loops (PLLs) to support the DRAM controller 20, UARTs 40, general purpose timers (GPT) 52, and a real-time clock (RTC) 60.

The DRAM controller 20 provides SDRAM (synchronous DRAM) support, symmetric and asymmetrical DRAM support, SDRAM auto refresh support, SDRAM Error Correction Code (ECC) support, DRAM write buffering support, DRAM read pre-fetching support, read-around-write support, and support for up to 256 megabytes of DRAM. The DRAM controller 20 may service requests from the CPU 36, the PCI host bridge 18 on behalf of an external PCI master, or the general purpose bus DMA controller and may issue commands to SDRAM devices. DRAM cycles may be also be initiated by a write buffer 28 or a read-ahead buffer 30 internal to the DRAM controller 20. The write buffer 28 and the read-ahead buffer 30 together provide buffering techniques to optimize DRAM system performance.

A data steering block 12 stores data and routes data as needed from 8/16-bit devices from/to the general purpose bus 72 to/from a CPU bus. On DMA SDRAM reads, the data steering block 12 may save data until the next address strobe.

A general purpose (GP) bus controller 24 controls the general purpose (GP) bus 72, an internal and external bus that connects 8- or 16-bit peripherals to the microcontroller M without glue logic. Features of the controller 24 include 8 external chip selects, programmable bus interface timing, "ready" signal support for external devices, and support for 8/16-bit I/O and memory mapped I/O cycles. In the disclosed embodiment, the general purpose bus 72 supports a programmable interrupt controller (PIC) 48, a programmable interval timer (PIT) 62, a watchdog timer (WDT) 32, the real-time clock (RTC) 60, the general purpose timers (GPT) 52, a software timer (SWT) 64, UARTs 40, a synchronous serial interface (SSI) 56, programmable I/O logic 50, and PC/AT compatibility logic 74.

The microcontroller M includes a DMA controller 22 (general purpose bus DMAC) on the general purpose bus 72. The controller 22 is shown integrated with the general purpose bus controller 24. The DMA controller 22 is designed to handle any DMA accesses between general purpose bus peripherals (internal or external) and DRAM. Features of the controller 22 includes support for up to 7 DMA request channels (with a maximum of 4 external requests), support for three 16-bit channels and four 8-bit channels, buffer chaining capability in enhanced mode, fly-by (single cycle) transfers between general purpose bus peripherals and DRAM, and variable clock modes. The controller 22 can operate in a PC/AT-compatible mode.

A PIO (programmable I/O) unit 50 provides PIO logic to support 32 programmable I/O signals (PIOs) to monitor signals and control devices not handled by other functions of the microcontroller M. The PIOs are shared with other functions on the microcontroller M.

A timers unit 52 provides general purpose timers for generic timing or counting applications. Features of the timers unit 52 include three 16-bit timers, two-stage cascading of timers, and several modes of operations.

An debug core 42 provides an integrated debug interface for embedded hardware/software debug during a special debug mode. Controllability and observability may be achieved through a fast JTAG-compliant serial interface.

A PCI host bridge 18 is integrated into the microcontroller M which allows the CPU 36 to generate PCI master transactions and allows external PCI masters to access the microcontroller DRAM space. The PCI Host bridge 18 may be a 33 MHz, 32-bit PCI bus Revision 2.2-compliant host bridge interface.

A PIC 48 includes 3 industry standard programmable interrupt controllers (PICs) integrated together with a highly programmable interrupt router. Two of the PICs 48 may be cascaded as slaves to a master PIC which arbitrates interrupt requests from various sources to the CPU 36. The PICs 48 may be programmed to operate in PC/AT-compatible mode. The router may handle routing of 33 various external and internal interrupt sources to the 22 interrupt channels of the three PICs.

A programmable interval timer (PIT) 62, which is compatible to 8254 PIT circuitry, is provided. The PIT 62 provides three 16-bit general purpose programmable channels, six programmable counter modes, and binary and BCD counting support.

The microcontroller M further includes an integrated reset controller 44 to control the generation of soft or hard resets to the CPU 36 and system resets to the various internal cores. The reset controller 44 provides a control bit to enable ICE mode after the CPU 36 has been reset.

An integrated ROM/Flash controller 10 provides a glueless interface to up to three ROMs, EPROMs, or flash devices. It supports asynchronous and advanced page-mode devices.

The RTC block 60 is compatible with the Motorola MC 146818A device used in PC/AT systems. The RTC 60 supports binary or BCD representation of time, calendar, and alarm, its own power pin and reset, 14 bytes of clock and control registers, 114 bytes of general purpose RAM, three interrupts sources, battery backup capability, and an internal RTC reset signal to perform a reset at power-up.

A synchronous serial interface (SSI) 56 provides efficient full-duplex and half-duplex, bi-directional communications to peripheral devices. Other features include clock speed programmable from 64 KHz to 8 MHz and multiple device enables.

A software timer (SWT) 64 is a peripheral on the GP bus 72 which provides a millisecond time base with microsecond resolution timing for software. The peripheral 64 includes a 16-bit millisecond up counter and a 10-bit millisecond up counter.

A test controller block 46 includes test logic such as the JTAG controller. The test logic is provided to test and ensure that the components of the microcontroller M function correctly.

A UART block 40 includes two PC 16550-compatible UARTs, both capable of running 16450 and 16550 software. The UART block 40 supports DMA operation, a FIFO mode, an internal baud rate clock to handle baud rates up to 1.5M bits/s, false start bit detection, break detection, full-duplex operation, and other features.

A watchdog timer block (WDT) 32 is a mechanism to allow system software to regain control of the microcontroller M when the software fails to behave as expected. The watchdog timer block 32 supports up to a 30-second time-out with a 33 MHz CPU clock.

The PC/AT compatibility logic 74 provides PC/AT-compatible functions. The PC/AT compatible integrated peripherals include the DMA controller 22, the PIT 62, the PIC 48, the UARTs 40, and the RTC 60.

This particular microcontroller is illustrative. The techniques and circuitry according to the invention could be applied to a wide variety of microcontrollers and other similar environments. The term "microcontroller" itself has differing definitions in industry. Some companies refer to a processor core with additional features (such as I/O) as a "microprocessor" if it has no onboard memory, and digital signal processors (DSPs) are now used for both special and general purpose controller functions. As here used, the term "microcontroller" covers all of the products, and generally means an execution unit with added functionality all implemented on a single monolithic integrated circuit.

I/O Address Space

Turning to FIG. 2, a list of integrated PC/AT peripherals and associated I/O address ranges in one aspect of the disclosed embodiment are shown. Standard PC/AT compatible peripherals are direct-mapped in an I/O space from 0000h to 03FFh. As can easily be seen from table 200, the I/O address space from 0000h-03FFh is, however, not completely assigned. For example, I/O ports 0010h-001Fh are not assigned to integrated devices, and access to those ports would normally go to an external bus. Similarly, other addresses in the 0000h-03FFh I/O address range default to the external bus. In the disclosed embodiment, this external bus is the GP bus 72. The GP bus 72 is both internal and external to the microcontroller M. The GP bus 72 is described in more detail in the commonly-assigned patent application entitled "GENERAL PURPOSE BUS WITH PROGRAMMABLE TIMING," previously incorporated herein by reference.

Alternatively, the "holes" or "windows" within the 0000h-03FFh I/O addresses can be redirected to the PCI bus 82. The PCI bus 82 can be coupled to non-PC/AT compatible peripherals. One skilled in the art will recognize that this list of integrated devices and associated I/O address ranges are illustrative only, and a different set of integrated devices and I/O address ranges could be provided without departing from the spirit of the invention. In addition, the use of the GP bus 72 and the PCI bus 82 is illustrative only, and other external or internal busses could be implemented without departing from the spirit of the invention. The integrated peripherals listed are compatible or effectively compliant with the PC/AT architecture. The PC/AT architecture is described in more detail in a commonly-assigned patent application, entitled "FLEXIBLE PC/AT-COMPATIBLE MICROCONTROLLER," previously incorporated herein by reference.

Figure 3:
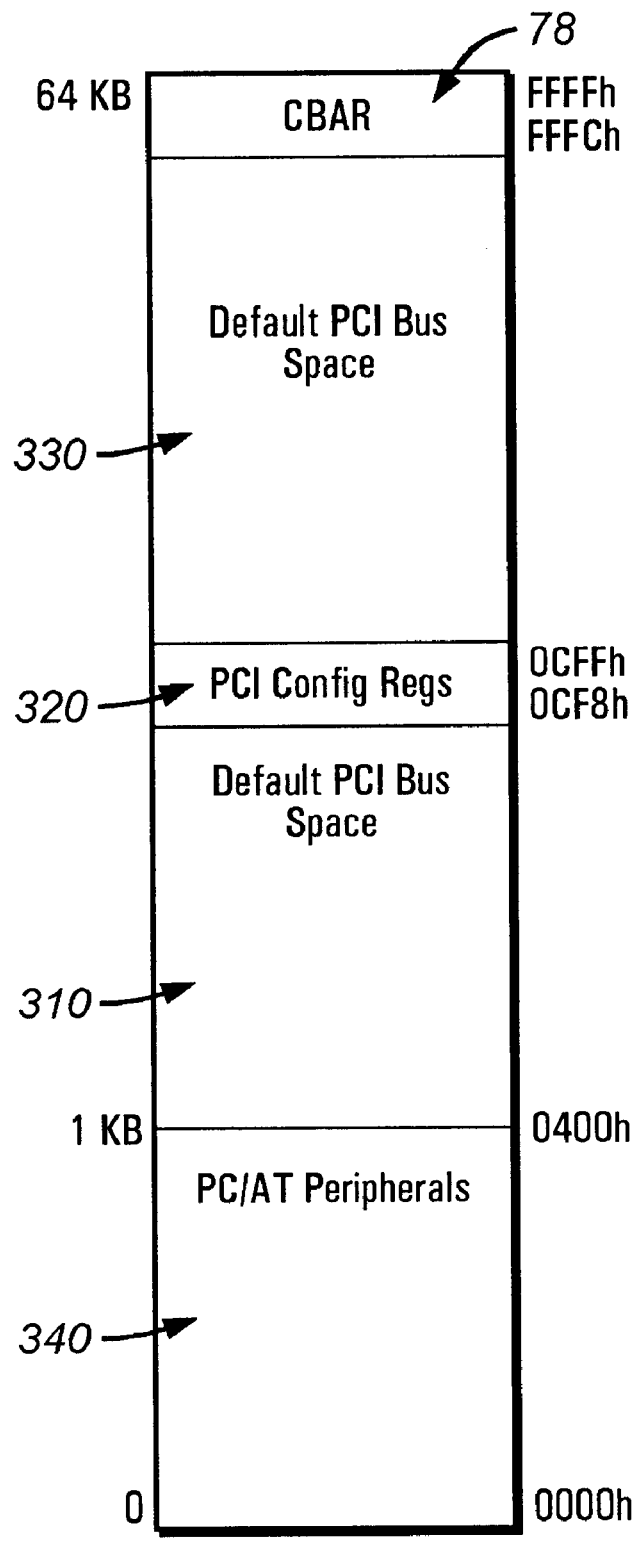
FIG. 3 is a diagram of an exemplary I/O address space of the microcontroller of FIG. 1.

Turning to FIG. 3, a map of the full 64KB I/O address space 300 of the microcontroller M shows one aspect of the disclosed embodiment. Standard PC/AT compatible devices are mapped in the region 340 of the I/O address space 0000h-03FFh. Unassigned I/O address space above the 03FFh line (in this example, the I/O addresses 0400h-0CF8h (the region 310) and the I/O addresses 0CFFh-FFFCh (the region 330)) is defaulted to a peripheral bus. The region 320 is used for indirectly mapping devices attached to the peripheral bus. In the disclosed embodiment, this peripheral bus is the PCI bus 82. In the disclosed embodiment, the programmable switch 420 and the set of programmable switches 430 reside in the memory address space at FFFEF080h, which is accessible only in protected mode. The CBAR 78 allows aliasing the programmable switch 420 and the set of programmable switches 430 to a location accessible in real mode, for ease of programming and flexibility.

Address Decoder Unit

Figure 4:
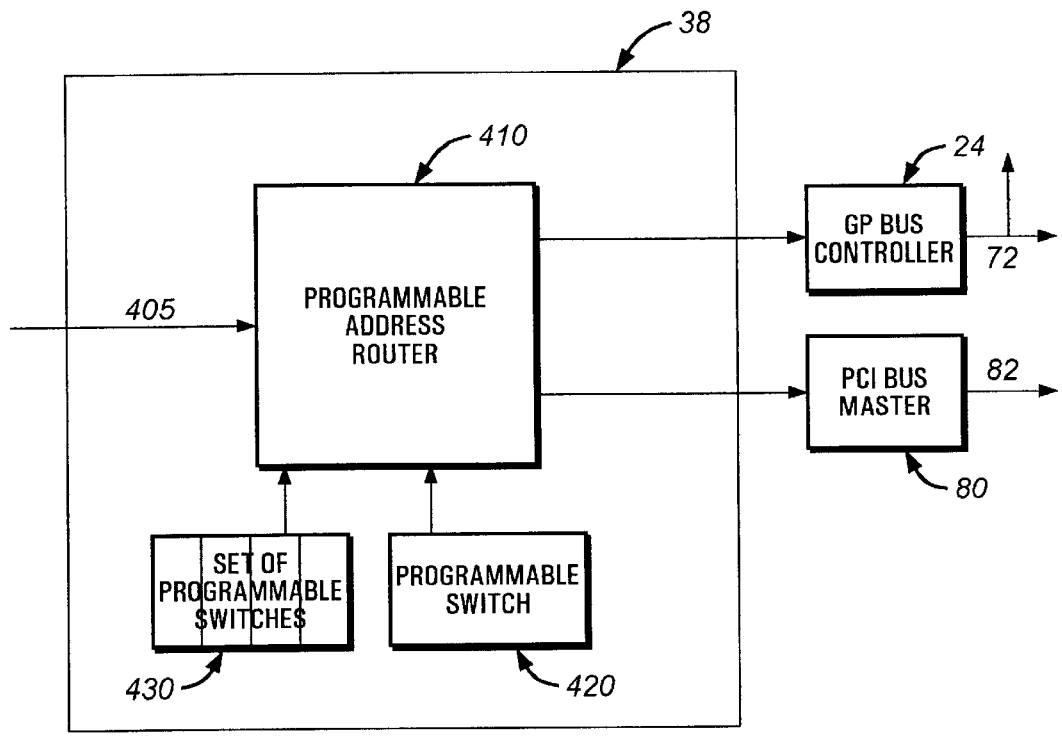
FIG. 4 is a block diagram of an exemplary programmable address decoder for redirecting I/O address space holes in the I/O address space of FIG. 3.

FIG. 4 is a block diagram showing the address decoder 38 for directing and redirecting I/O addresses. The address decoder 38 includes a programmable address router 410 coupled to a programmable switch 420 and programmable switches 430. The design and operation of a programmable address router and programmable switches are generally understood to those skilled in the art. The address decoder 38 is described in more detail in a commonly-assigned patent application, entitled "METHOD AND APPARATUS FOR OVERLAPPING PROGRAMMABLE ADDRESS REGIONS," previously incorporated herein by reference. The programmable switch 420 controls the actions of the programmable address router 410. When an I/O address signal 405 is received by the programmable address router 410, if the I/O address is assigned to one of the integrated devices on the internal GP bus 72, then the programmable address router 410 directs the address signal 405 to the GP bus controller 24. If the I/O address in address signal 405 is above 03FFh then the address signal 405 is routed to the PCI master 80 (the PCI bus controller in this case) for sending the address signal over the PCI bus 82. If the I/O address in address signal 405 is less than 04000h and has not been assigned to one of the integrated devices on the internal GP bus 72, then a value generated by the programmable switch 420 controls the actions of the programmable address router 410. When the programmable switch 420 provides one predetermined value, address signal 405 is routed to the GP bus controller 24 for routing the address signal 405 to external devices on the GP bus 72. If the programmable switch 420 provides a second predetermined value, then the address signal 405 is routed to the PCI bus controller 80 for sending the associated I/O address to the PCI bus 82.

In another aspect of one embodiment, a collection of programmable switches 430 also control the programmable address router 410. Each of the switches in the set of programmable switches 430 is associated with one of the integrated devices on the internal GP bus 72. In the disclosed embodiment, only the RTC 60 and the two UARTs 40 are associated with one of the programmable switches 430, but other integrated devices could be associated without departing from the spirit of the invention. When one of the programmable switches 430 provides one predetermined value, programmable address router 410 disables or bypasses the associated integrated device and routes address signal 405 to the GP bus controller 24 for routing on the external GP bus 72. If one of the programmable switches 430 provides another predetermined value, then the programmable address router 410 enables or re-enables the associated integrated device and routes address signal 405 to the GP bus controller 24 for sending the associated I/O address on the internal GP bus 72 to the particular integrated device. In this way, an I/O address can be selectively directed to an associated integrated device or to the external GP bus 72 based on the state of one of the programmable switches 430. Those skilled in the art will appreciate that other implementations of the address decoder 38 are possible.

Figure 5:
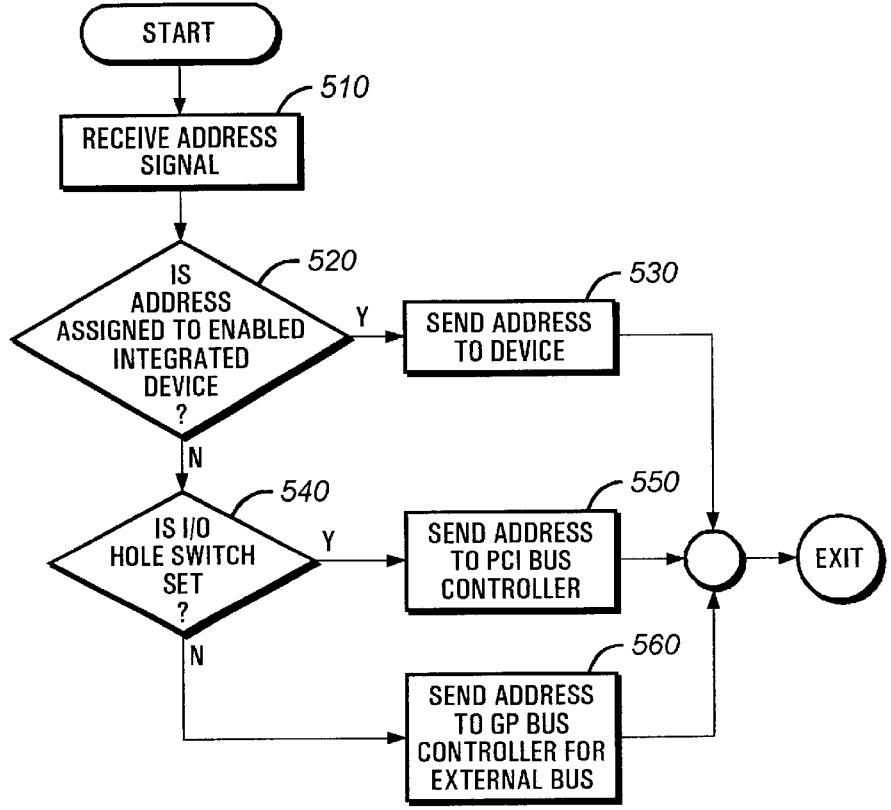
FIG. 5 is a flow chart of an exemplary technique of redirecting holes in the I/O address space of FIG. 3 in accordance with the mechanism of FIG. 4.

FIG. 5 is a flow chart showing a technique for redirecting an I/O address below the 04000h line according to one aspect of a disclosed embodiment. In step 510, the I/O address signal is received. In step 520, the I/O address is examined to determine if the address has been assigned to one of the integrated devices. If that I/O address has been assigned to an enabled integrated device, then in step 530 the address is sent to that device. If the I/O address is currently unassigned or if the I/O address has been assigned to an integrated device that has been disabled, then in step 540 the value of the programmable switch 420 is examined. If the programmable switch 420 is set to redirect unassigned I/O addresses to the PCI master 80, then in step 550 the address is sent to the PCI master 80; otherwise, in step 560 the I/O address is sent to the GP bus controller 24 to be sent over the external GP bus 72. An advantage of such a mechanism according to the disclosed embodiment is that new devices built for a peripheral bus can be directly mapped to the ports, avoiding the performance penalties associated with indirectly mapping I/O addresses to the peripheral bus. Another advantage of such a mechanism according to the disclosed embodiment is that software drivers can be made independent of the bus to which the device is connected.

It may be desirable to connect a commercially available Super I/O chip on the external GP bus 72 in a system according to the disclosed embodiment. For example, systems requiring a keyboard may implement the Super I/O chip. In this case, because the Super I/O chip implements two UARTs programmed at the same addresses as the integrated UARTs, the internal UARTs can be disabled to support the COM1 and COM2 ports in the Super I/O chip, if desired. In this case, when the CPU 36 performs all I/O accesses to the UART address regions the addresses will be redirected to the external GP bus 72. Details of connecting the Super I/O chip to the microcontroller's GP bus can be found in the commonly-assigned application entitled "FLEXIBLE PC/AT-COMPATIBLE MICROCONTROLLER," previously incorporated by reference.

Thus, I/O address holes can be selectively directed and redirected to multiple bus controllers. The relevant bus controller places the particular I/O address on the associated bus. The I/O address can then be claimed by the relevant device coupled to the bus. With this capability to direct and redirect I/O address holes, an I/O address can selectively be directed to an internal bus and associated peripheral devices or redirected to an external bus and associated peripheral devices. For certain applications, directing I/O address holes to internal peripheral devices may be desired, while for other applications, directing I/O address holes to external peripheral devices may be desired. The capability to direct I/O address holes can also be used to direct I/O address holes to PC/AT compatible peripheral devices or non-PC/AT compatible peripheral devices. For example, one bus can be coupled to PC/AT compatible peripheral devices and another bus can be coupled to non-PC/AT compatible peripheral devices. By coupling the disclosed programmable address decoder 38 or similar decoding logic to both busses, I/O address holes can be directed to PC/AT compatible peripheral devices or non-PC/AT compatible peripheral devices such that the microcontroller M supports a PC/AT compatible mode and a non-PC/AT compatible mode.

The foregoing disclosure and description of the various embodiments are illustrative and explanatory thereof, and various changes in the descriptions of the microcontroller, integrated devices, programmable address router, the programmable switches, and other circuitry, the organization of the components, and to the order and timing of steps taken, as well as the details of the illustrated system may be made without departing from the spirit of the invention.

What is claimed is:

1. A programmable address decoder for a system having an I/O address space, a first bus controller and a second bus controller, the programmable address decoder being configured to redirect addresses in the I/O address space, the programmable address decoder comprising:

a programmable address router coupled to the first bus controller and the second bus controller, the programmable address router routing addresses from a host bus to the first bus controller and the second bus controller without claiming the addresses; and a programmable switch coupled to the programmable address router to route addresses to the first bus controller when the programmable switch corresponds to a first predetermined value and to the second bus controller when the programmable switch corresponds to a second predetermined value.

2. A programmable address decoder as in claim 1, wherein the second bus controller is a Peripheral Component Interconnect (PCI) bus master.

3. A programmable address decoder as in claim 1, further comprising:

a set of programmable switches to disable and enable a set of integrated devices in the system and mapped to the I/O address space.

4. A programmable address decoder as in claim 3, wherein the programmable address router routes addresses assigned to disabled devices of the set of integrated devices.

5. A microcontroller adapted to selectively direct I/O addresses, comprising:

a processor to generate an I/O address signal;

a set of integrated devices addressable in the I/O address space;

a first bus controller and a second bus controller; and a programmable address decoder to receive and route the I/O address signal, comprising:

routing circuitry to route a first set of I/O address space signals for I/O addresses assigned to the set of integrated devices to the set of integrated devices;

a programmable address router to selectively route a second set of I/O address space signals to the first bus controller and the second bus controller, the programmable address router routing addresses to the first bus controller and the second bus controller without claiming the addresses; and a programmable switch to program the programmable address router to route I/O address space signals for unassigned I/O addresses to the first bus controller when the programmable switch corresponds to a first predetermined value and to the second bus controller when the programmable switch corresponds to a second predetermined value.

6. The microcontroller as in claim 5, wherein the set of integrated devices is effectively compliant with the PC/AT architecture.

7. The microcontroller as in claim 5, wherein the second bus controller is a Peripheral Component Interconnect (PCI) bus master.

8. A microcontroller as in claim 5, the programmable address decoder comprising:

a set of programmable switches to disable and enable a set of integrated devices in the microcontroller and mapped to the I/O address space.

9. A microcontroller as in claim 5, wherein the programmable address router routes I/O addresses assigned to disabled devices of the set of integrated devices.

10. A method of directing I/O addresses, comprising the steps of:

examining a programmable value;

directing a set of I/O addresses to a first bus without claiming the I/O addresses if the programmable value corresponds to a first predetermined value; and directing the set of I/O addresses to a second bus without claiming the I/O addresses if the programmable value corresponds to a second predetermined value.

11. A method as in claim 10, further comprising the steps of:

disabling an I/O device of a set of integrated I/O devices mapped to the first bus; and selectively directing I/O addresses assigned to the I/O device to the first bus or the second bus depending on the programmable value.

12. The method as in claim 10, wherein the set of I/O addresses comprises I/O address holes.

13. The method as in claim 10, wherein the set of I/O addresses are within an I/O address space of a microcontroller.

14. The method as in claim 10, the directing a set of I/O addresses to a first bus step comprising:

redirecting the set of I/O addresses from the second bus to the first bus if the programmable value corresponds to a first predetermined value.

15. The method as in claim 10, the directing a set of I/O addresses to a second bus step comprising:

redirecting the set of I/O addresses from the first bus to the second bus if the programmable value corresponds to a second predetermined value.

16. The method as in claim 10, wherein the first bus is coupled to a set of PC/AT compatible devices and the second bus is coupled to a set of non-PC/AT compatible devices.

* * * * *